C. BERNE.
RESILIENT TIRE FOR VEHICLE WHEELS.
APPLICATION FILED APR. 4, 1921.
1,410,359. Patented Mar. 21, 1922.
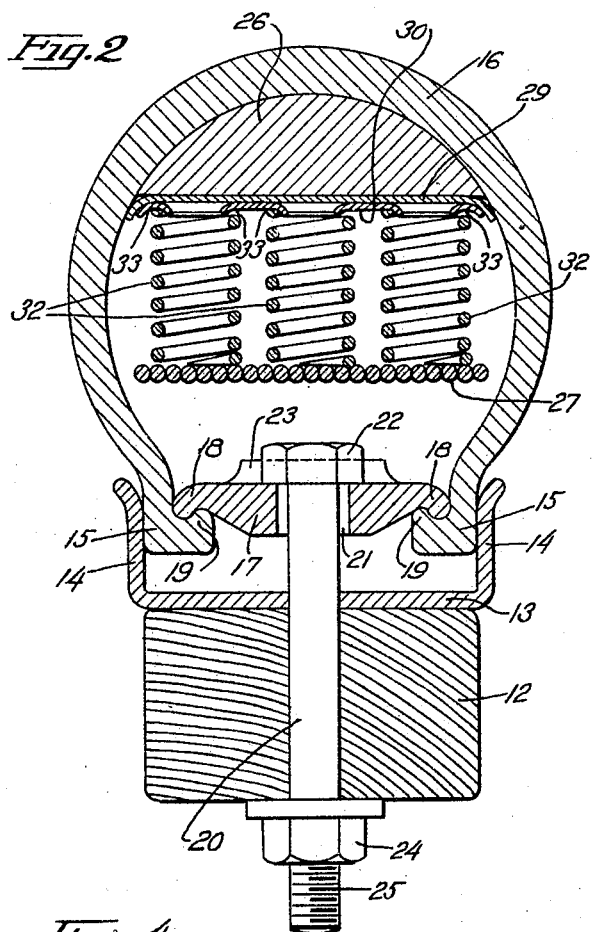
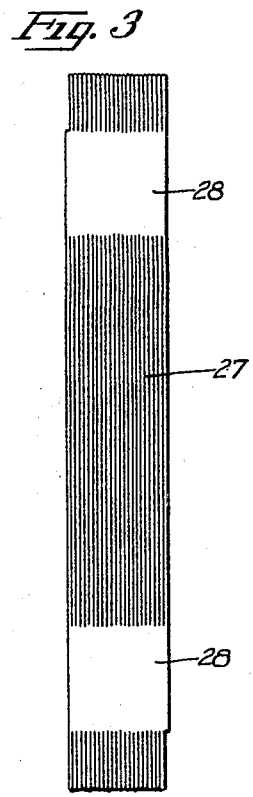
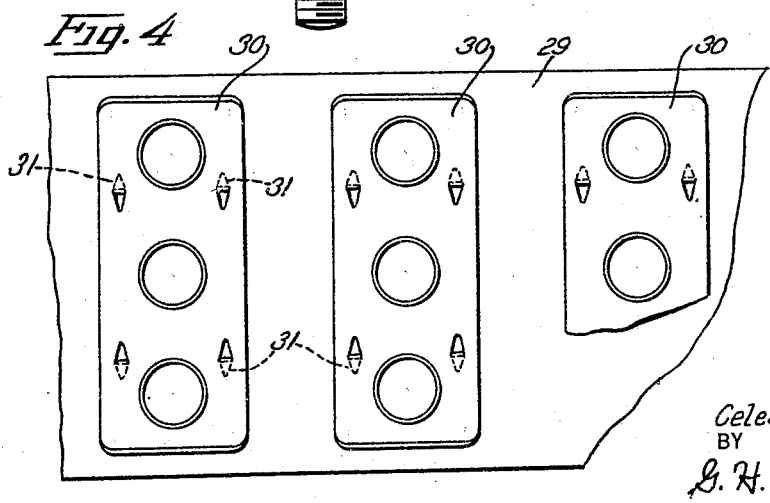
INVENTOR
Celestin Berne
BY
G. H. Braddock
ATTORNEY

UNITED STATES PATENT OFFICE.

CELESTIN BERNE, OF BRIDGEPORT, CONNECTICUT.

RESILIENT TIRE FOR VEHICLE WHEELS.

1,410,359.  Specification of Letters Patent.  Patented Mar. 21, 1922.

Application filed April 4, 1921. Serial No. 458,298.

*To all whom it may concern:*

Be it known that CELESTIN BERNE, a citizen of France, and resident of Bridgeport, in the county of Fairfield and State of Connecticut, has invented certain new and useful Improvements in Resilient Tires for Vehicle Wheels, of which the following is a specification.

This invention relates to an improved resilient tire for vehicle wheels.

An object of the invention is to provide an efficient tire of simple, practical and economical construction.

A further object is to provide a novel tire equipped with spring means adapted to render the tire as resilient as a pneumatic tire, and to so construct and arrange the spring means in the tire casing that said spring means can be readily adjusted to cause the tire casing to be under any desired tension to have a preferred amount of resiliency.

Still further objects are to provide novel means for securing the tire to a rim and to provide in said tire resilient means capable of being adjusted by simple manipulation of said securing means to vary the resiliency of the tire casing; and to include in the resilient means a continuous, metallic ring arranged to float about said rim in spaced relation therefrom to constitute a resilient support (1) for adjusting the spring means to increase or lessen the resiliency of the tire casing and (2) for causing pressure against the tire casing when in use to be uniformly distributed throughout the resilient means as a whole, instead of against a small portion thereof as heretofore.

Other objects and advantages will become apparent as the description proceeds.

In the accompanying drawing forming a part of this specification,

Fig. 2 is a sectional view, on a greatly enlarged scale, on line 2—2 in Fig. 1;

Fig. 3 is an edge view, on the scale of Fig. 1, of the continuous, metallic ring; and Fig. 4 is a detail view, on the scale of Fig. 2, of a fragment of the flexible or fabric band enclosing the spring means of the tire, disclosing several of the metallic plates attached to the band and adapted to provide seats for the springs.

Figure 1:
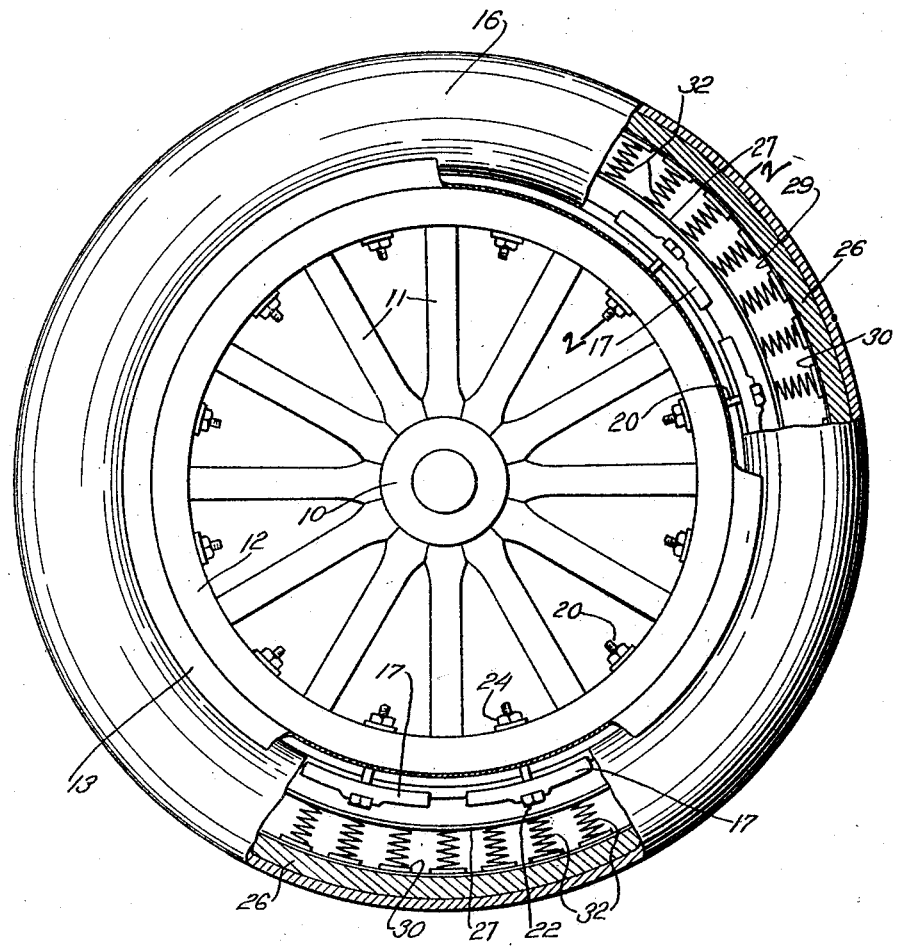
Fig. 1 is an elevational view of a vehicle wheel equipped with the novel tire, portions of the tire being shown broken away.

Referring to the drawing, 10 denotes a wheel hub, 11 spokes, 12 a felly, and 13 a rim upon the felly. The rim is preferably U-shape in cross-section, it having at its opposite side edges circumferential, outwardly extending flanges, denoted by 14, between which the inner edges, denoted by 15, of the tire casing 16 are adapted to fit, as will be understood.

Numeral 17 denotes a series of anchors, preferably of about the construction shown, having oppositely extending arms 18 adapted to be positioned transversely of the tire to engage at intervals annular, internally positioned shoulders 19 upon the inner edges 15 of the tire casing. Any number of anchors 17 may be employed and the anchors may be spaced any suitable distance apart. As shown, I utilize twelve, and I position the same between the outer ends of the twelve spokes. The anchors may be secured to the rim and felly by means of bolts 20 having snug, sliding fit in aligning holes in the rim and felly and freely arranged in holes 21 in the anchors, the bolts being provided with heads 22 adapted to fit in concavities 23 in the outer faces of the anchors. Nuts 24 upon the opposite, threaded portions 25 of the bolts and adapted to engage the inner face of the felly may be utilized to fasten down the bolts, as will be obvious.

Within the tire casing is arranged a filler 26 which may be of usual construction, this filler extending the full circumference of the tire and having its outer face of proper configuration to engage the inner face of that part of the tire casing adapted to bear upon the ground. Also within the tire casing and spaced from the filler and rim and arranged to float about the rim is a continuous, metallic ring 27 which may be a band of suitable metal, or may, as more clearly shown in Figs. 2 and 3, consist of continuous coils of suitable wire soldered or otherwise fastened together as suggested by numeral 28. Numeral 29 denotes a continuous, flexible band, preferably composed of canvas or the like, which is adapted to be arranged against the inner face of the filler 26, and 30 denotes metallic plates arranged transversely of the flexible band and spaced at suitable intervals therearound, the plates being secured to the band in any preferred manner, as by means of lugs 31 struck from the plates, forced through the fabric of the band and fastened down, as will be apparent. Between the metallic plates and the continuous, metallic ring are arranged a series of coil springs 32. Any number of these springs may be utilized. I preferably employ three springs for each metallic plate and arrange the same in alignment and transversely of the tire. As shown, one end of each spring rests against a metallic plate, said plates preferably being suitably struck up, as indicated by numeral 33, to provide seats for the springs, and the other end of each spring rests against and may be secured to the continuous metallic ring.

In assembling the parts of the tire, the coil springs are first arranged between the continuous, metallic ring and the continuous flexible band, and the ring, band and springs are then positioned in the tire casing so that the flexible band engages the filler 26, as will be understood. The inner edges 15 of the tire casing are next inserted between flanges 14 of the rim, and the anchors are afterwards fastened down in the manner already set forth.

As now to be made clear, the inner edges 15 of the tire casing may be fastened down against the main body portion of the rim, or they may as suggested in Fig. 2, be spaced therefrom a greater or less distance, and the resiliency of the tire casing will depend upon the position to which the anchors are adjusted. It is to be understood that when the inner edges of the tire casing are arranged about as shown in Fig. 2, the coil springs 32 are in their expanded, normal positions, and while the continuous, metallic ring is resilient, it must have sufficient strength to withstand considerable stress without losing its shape. When then the anchors are caused to move to or toward the main body portion of the rim, the inner edges of the tire casing will be correspondingly moved and the continuous, metallic ring will remain in stationary position to serve as a support for tensioning said tire casing. That is to say, as the inner edges of the tire casing are drawn toward the main body portion of the rim, the continuous, metallic ring will retain its shape and the coil springs will be compressed to render the tire casing less resilient, the fabric band, obviously, offering no hindrance to the compression of said springs. The tire casing can, consequently, be given any desired amount of resiliency.

When the parts of the tire have been assembled as hereinbefore described, the continuous, metallic ring will be arranged to float about the rim in spaced relation therefrom. When then the tire is in use and pressure is exerted against that part of the tire casing which rests upon the ground, said pressure will be uniformly distributed to all of the coil springs. That is to say, pressure against the part of the tire casing upon the ground will tend to move the adjacent inner edges of the tire casing toward the main body portion of the rim, but this pressure will be transferred to the continuous, metallic ring as a whole, and said ring, by reason of its resiliency, will yield to uniformly distribute the pressure to all of the coil springs. The tire casing, obviously, cannot become removed from the flanges of the rim and the arms of the anchors for the reason that the continuous, metallic ring will at all times remain in fixed relation with respect to the rim and will retain its circular shape.

Having thus fully described the invention, what I claim and desire to secure by Letters Patent is:

1. A tire comprising a tire casing, resilient means therein, and a rim carrying the casing, said resilient means including a continuous, metallic ring arranged to float about said rim and to continuously change its shape so that said resilient means as a whole is under uniform pressure.

2. A tire comprising a tire casing, a filler therein, a rim carrying the casing, a metallic ring in said casing and spaced from said filler and rim, said metallic ring adapted to continuously change its shape, and resilient means located between said filler and metallic ring, whereby said metallic ring may float about said rim to support said tire casing and to exert the same pressure against all of said resilient means.

3. A tire comprising a tire casing, a filler therein, a rim carrying the casing, a continuous, metallic ring in said casing and spaced from said filler and rim to float about said rim, said metallic ring adapted to continuously change its shape, a flexible band engaging said filler, and springs between said band and ring whereby the metallic ring may exert the same pressure against all of said springs.

4. A tire comprising a tire casing, a filler therein, a rim carrying the casing, a resilient, metallic ring in said casing and spaced from said filler and rim to float about said rim, a flexible band engaging said filler, spaced apart, metallic plates upon said band, and coil springs between said plates and ring, whereby when pressure is exerted against said casing, said resilient ring will yield to uniformly distribute said pressure to all of said coil springs.

Signed at Bridgeport, in the county of Fairfield, and State of Connecticut, this 19th day of March, A. D., 1921.

CELESTIN BERNE.